United States Patent [19]
Sato et al.

[11] Patent Number: 5,273,613
[45] Date of Patent: Dec. 28, 1993

[54] BAND CONVEYING DEVICE WITH VACUUM ATTRACTION MECHANISM

[75] Inventors: Hidemasa Sato; Jiro Agawa, both of Nagasaki, Japan

[73] Assignee: Mitsubishi Jukogyo Kabushiki Kaisha, Tokyo, Japan

[21] Appl. No.: 769,639

[22] Filed: Oct. 1, 1991

[30] Foreign Application Priority Data

Oct. 2, 1990 [JP] Japan .................. 2-263162

[51] Int. Cl.$^5$ ............................................. B29D 30/26
[52] U.S. Cl. ..................................... 156/406.2; 269/21
[58] Field of Search ............... 156/406.2, 126, 396; 269/21; 279/3; 248/363; 211/23, 24

[56] References Cited

U.S. PATENT DOCUMENTS

| | | | |
|---|---|---|---|
| 2,788,411 | 4/1957 | Porwancher | 248/363 |
| 3,229,953 | 1/1966 | Muir, Jr. | 269/21 |
| 3,484,093 | 12/1969 | Mermelstein | 269/21 |
| 3,729,206 | 4/1973 | Cachon et al. | 279/3 |
| 3,754,751 | 8/1973 | Capetti et al. | |
| 4,007,080 | 2/1977 | Klopper | |
| 4,634,489 | 1/1987 | Dupommier | 156/406.2 |

FOREIGN PATENT DOCUMENTS

| | | |
|---|---|---|
| 0169162A3 | 1/1986 | European Pat. Off. |
| 3910886A1 | 10/1989 | Fed. Rep. of Germany |
| 2084435 | 12/1971 | France |
| 2590019 | 5/1987 | France |
| 2225768A | 6/1990 | United Kingdom |

*Primary Examiner*—Geoffrey L. Knable
*Attorney, Agent, or Firm*—Wenderoth, Lind & Ponack

[57] ABSTRACT

A band conveying device with a vacuum attraction mechanism comprises a base frame, a traveling carriage movable on the base frame and a plurality of band holding units arranged in a row and provided on the traveling carriage perpendicularly with respect to a traveling direction thereof. A plurality of vacuum pads for attracting and holding a band with a vacuum are arranged in an annular form and attached to the band holding units. The vacuum pads are divided into the two vacuum systems. Each of at least two vacuum systems is provided with a vacuum pressure switch and an electromagnetic valve for shutting off its vacuum system when its degree of vacuum decreases below a given level.

3 Claims, 6 Drawing Sheets

BAND CONVEYING DEVICE WITH VACUUM ATTRACTION MECHANISM

BACKGROUND OF THE INVENTION

1. Field of the Invention

This invention relates to a band conveying device for use with a tire forming machine.

2. Description of the Prior Art

The present applicant filed Japanese Patent Application No. 63-82989, which discloses a tire conveying device and proposes to attract a member to be conveyed by vacuum, does not teach vacuum attraction being performed with respect to any surface portion of the member to be conveyed except a joint portion.

In the process of forming a tire, a band is formed by winding a belt-shaped material around a cylindrical drum.

A so-called vacuum attractor (vacuum pad) is effective in attracting a smooth surface, but not a rough surface having a stepped portion. The reason is that the vacuum attractor cannot fit with the stepped surface portion of the member to be attracted, thus leaving a gap between them so that air is sucked through the gap, disabling vacuum attraction. Since a plurality of vacuum attractors are usually connected together by one pipeline, if at least one vacuum attractor becomes disabled, the others cannot get a sufficient vacuum and attain their function.

When the belt-shaped material is wound around the drum in a tire forming machine, each resulting joined portion of the material causes roughness in the form of a stepped portion. Since the position of such a stepped portion can be detected, it is possible to position the vacuum attractors so as not to avoid the stepped portion. However, the belt-shaped material is usually formed by joining a plurality of material segments of a given length, and each resulting joined portion causes roughness in the form of another stepped portion. Such another stepped portion can hardly be detected by the forming machine. Even if this second type of stepped portion can be detected, it is very difficult to position the vacuum attractors so as not to confront the two types of stepped portions. Consequently, the band cannot be conveyed reliably.

SUMMARY OF THE INVENTION

It is an object of the present invention to provide a band conveying device with a vacuum attraction mechanism which can reliably convey a band having joined portions arising when belt-shaped material segments are joined together and when the resulting belt-shaped material is wound around a drum.

To accomplish the foregoing object, the present invention provides a band conveying device with vacuum attraction mechanism which comprises a base frame extending between a band forming station and a tire assembling station. A traveling carriage is movable on the base frame, and a plurality of band holding units provided on the traveling carriage perpendicularly with respect to the traveling direction thereof. A and a plurality of vacuum pads for attracting and holding a band by vacuum are arranged in an annular form and attached to the band holding units, and is characterized in that the vacuum pads are divided into at least two vacuum systems. Each of the at least two vacuum systems is provided with a vacuum pressure switch and an electromagnetic valve for shutting off the vacuum system when its degree of vacuum decreases below a given level.

As will be appreciated, according to the present invention, the vacuum pads are divided into at least two vacuum systems, and a vacuum is applied to the individual vacuum systems. When the degree of vacuum of any vacuum system cannot reach a given level, the vacuum supply to the malfunctioning vacuum system is shut off, and the other vacuum systems having a sufficient vacuum are used in band conveying.

A joined portion arising in the process of a tire forming machine can be put aside. On the other hand, the joined portion of therefore material appears at only one point along the circumference. The even when the joined portion of the material causes one vacuum system to have an insufficient vacuum, the other vacuum systems can well attract the band by vacuum, whereby the band can be reliably conveyed.

DESCRIPTION OF THE PREFERRED EMBODIMENT

An embodiment of the present invention will now be described with reference to the drawings.

In FIGS. 1 through 7, A designates a band holding unit, C a traveling carriage, D a base frame, 2 a band, B1 a vacuum source, B2, B3 B4 electromagnetic valves, B5 B6 vacuum pressure switches, and A17, A21 A22 vacuum pads.

Figure 1:
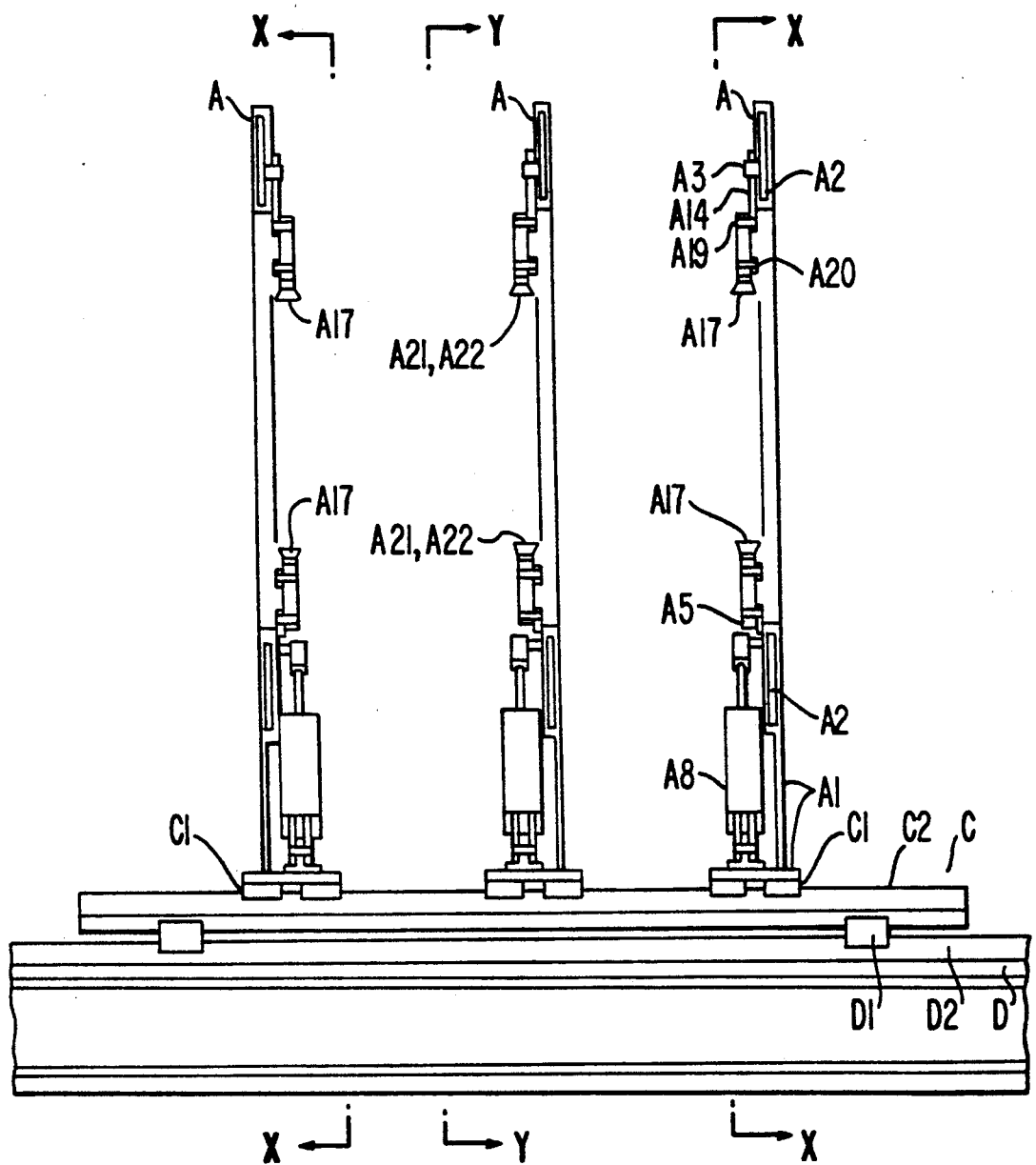
FIG. 1 is a side view showing a band conveying device according to the present invention.

In FIG. 1, each band holding unit A is slidably supported via a rectilinear bearing C1 and a rail C2 on the traveling carriage C. The three band holding units are moved on the traveling carriage C by a positionable driving unit (not shown).

The band holding units A will be described in greater detail with reference to FIGS. 1 through 3.

A frame A1 is secured on the rectilinear bearing C1, a cam A2 is fitted in the frame A1, and pins A3 and A4 are secured to the cam A2. A pin A5 is also secured to the cam A2 and a plurality of grooves A6 are formed. A driving unit A8 of the positionable type is pivotably supported via a pin A10 by a bracket A7 attached to the frame A1, and a clevis A9 at the end of a rod A11 of the driving unit A8 is pivotably supported by the pin A5. The frame A1 has a nut A13 attached thereto, and a screw rod A12 is threaded into the nut A13. This screw rod A12 is attached via a bearing (not shown) to the traveling carriage.

A plurality of levers A14 are pivotably supported by pins A3, and one end A16 of each lever A14 is inserted in the corresponding groove A6 of the cam A2.

A plurality of levers A15 are pivotably supported by pins A4 secured to the frame A1.

Figure 3:
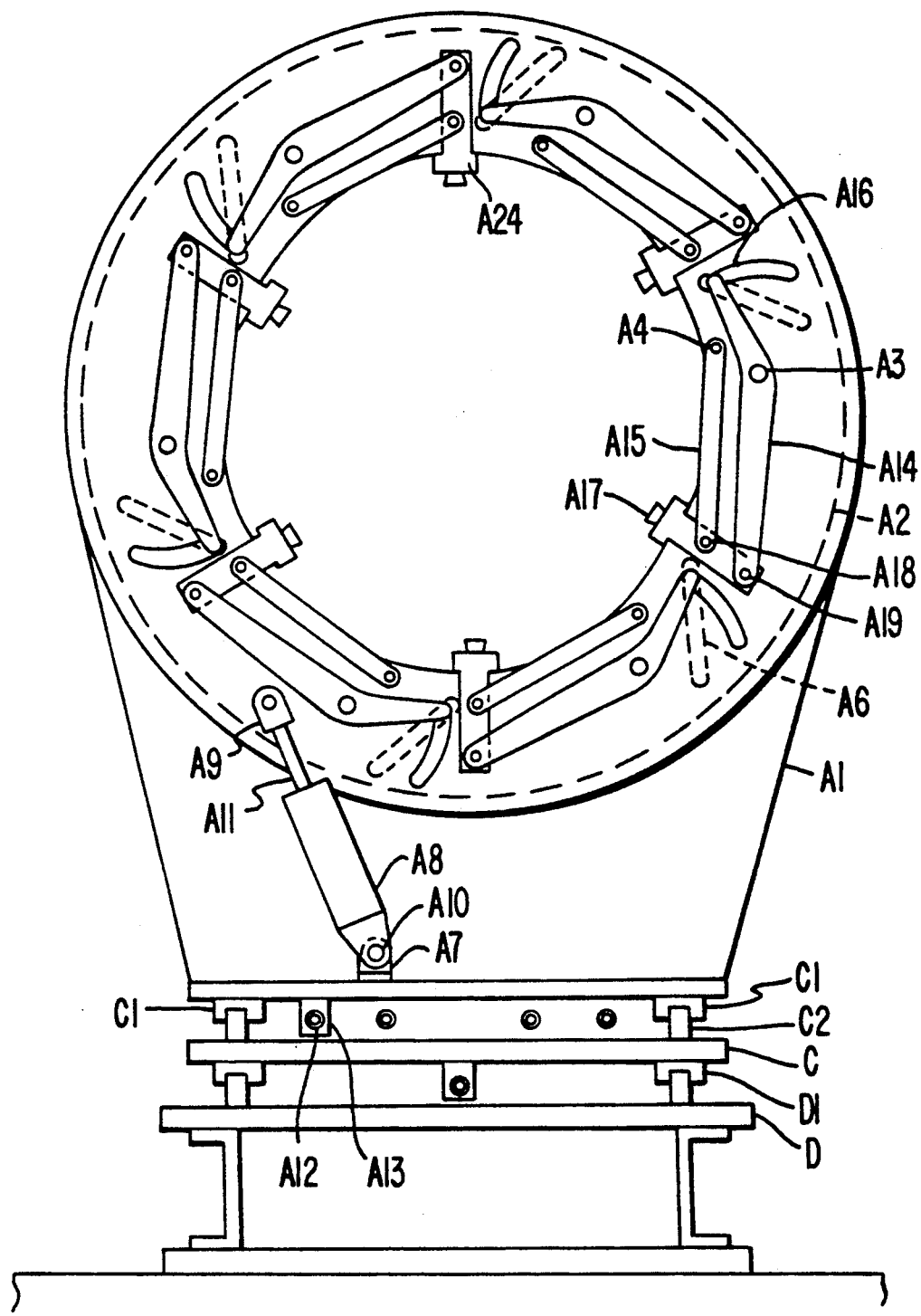
FIG. 3 is a view taken in the direction of the arrow X in FIG. 1.

FIG. 3 shows the band holding unit disposed at either end, in which a vacuum pad A17 is secured to a corresponding block A24. Each block A24 has pins A18 and A19 secured thereto, and the corresponding levers A14 and A15 are pivotably supported thereby. The distance between the pins A3 and A19 of the lever A14 is equal to that between the pins A4 and A18 of the lever A15.

Figure 2:
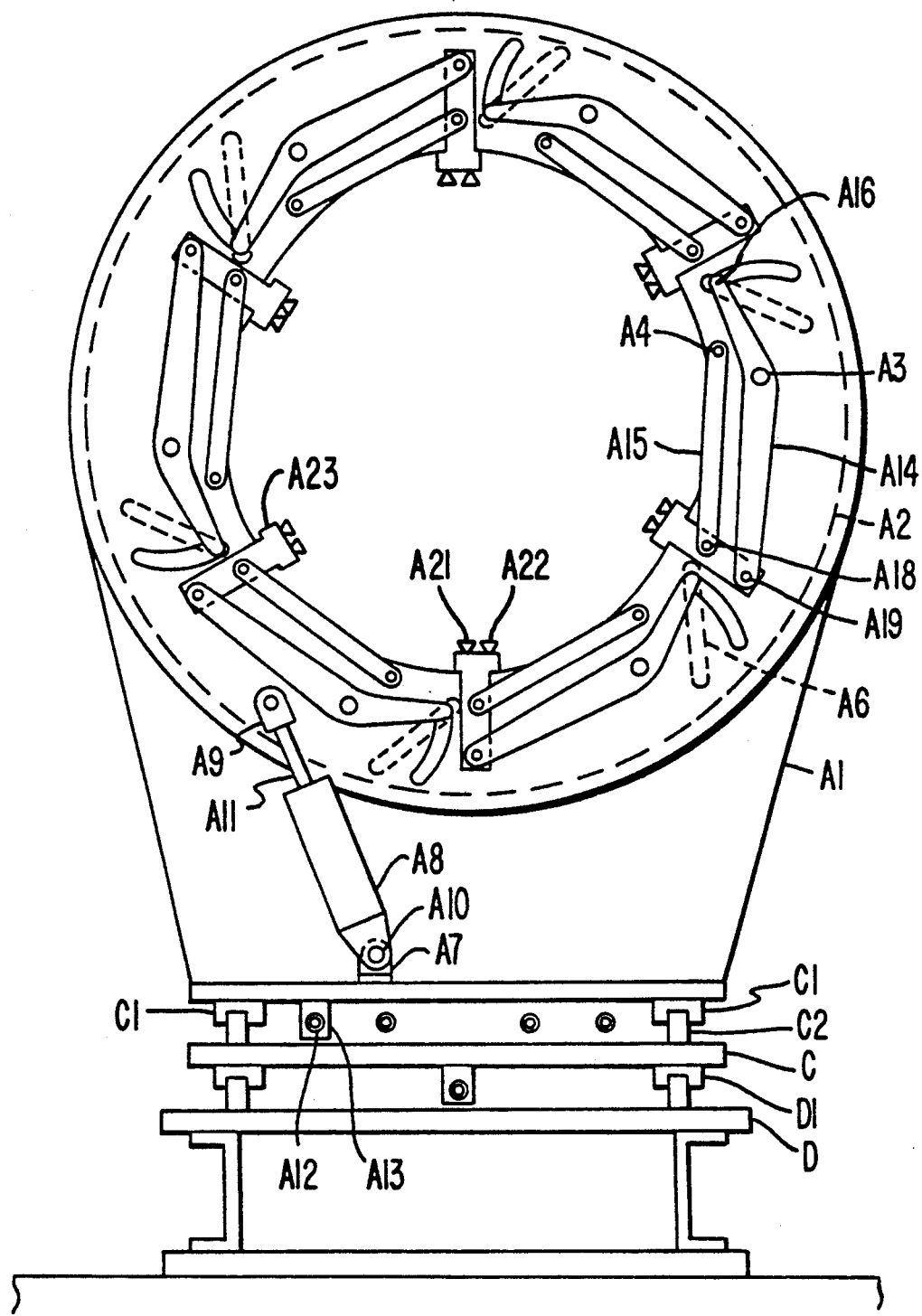
FIG. 2 is a view taken in the direction of the arrow Y in FIG. 1.

FIG. 2 shows the band holding unit disposed at the center, in which the vacuum pads A21 and A22 are arranged in the circumferential direction and secured to a corresponding block A23 as illustrated. The pins A18 and A19 are secured to each block A23. The support mechanism of the block A23 is identical with that illustrated in FIG. 3.

Figure 4:
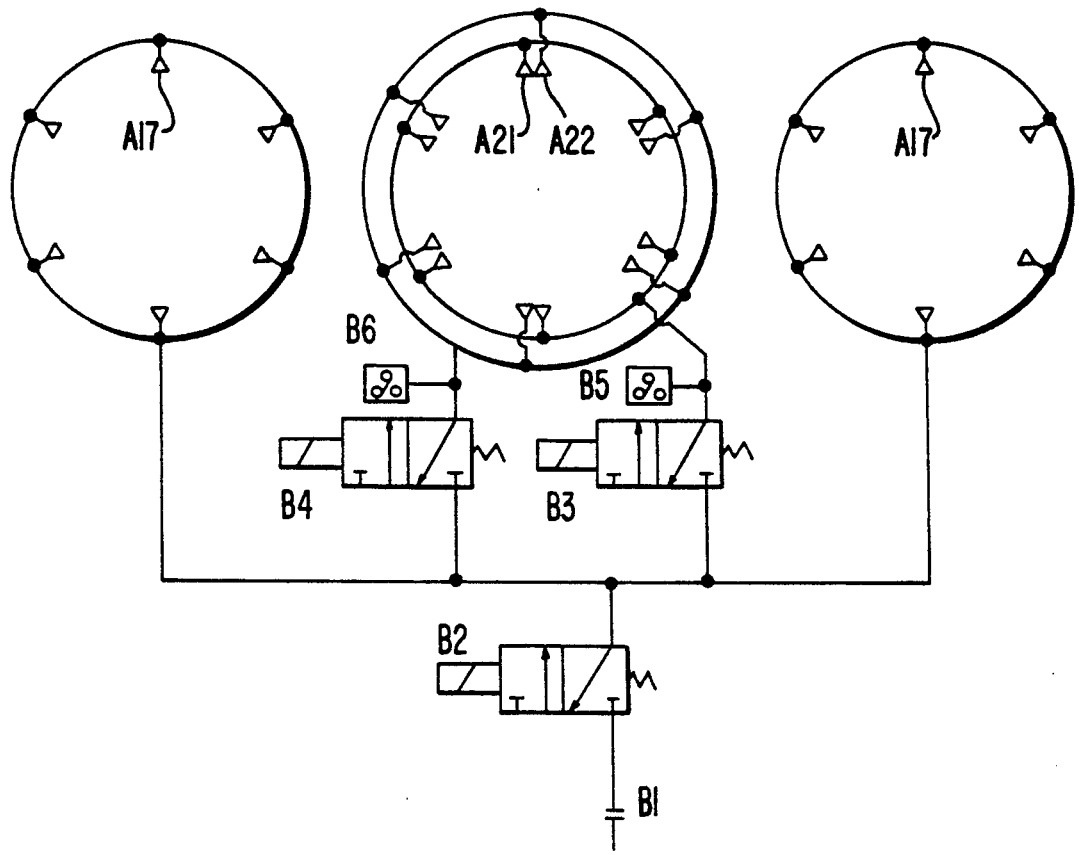
FIG. 4 is a diagram showing a pipeline network for vacuum pads.

The pipeline network of the vacuum pads A17, A21 and A22 will be described with reference to FIG. 4.

The vacuum pads A17 of the band holding units disposed at either end are connected together by branch lines extending from one pipeline, and are actuated and by the electromagnetic valve B2. The vacuum pads A21 and A22 of the band holding unit disposed at the center are actuated and deactuated by the electromagnetic valves B3 and B4, respectively. Vacuum for the electromagnetic valves B3 and B4 is supplied from the output end of the electromagnetic valve B2. The output ends of the electromagnetic valves B3 and B4 are connected to the vacuum pressure switches B5 and B6, respectively.

The operation of the foregoing units will be described.

When the band is to beheld, first the electromagnetic valve B2 is turned on to actuate the vacuum pads A17. Then, the electromagnetic valve B3 is turned on. The pressure switch B5 monitors and determines whether or not sufficient a vacuum is reached. When sufficient vacuum is reached, the electromagnetic valve B3 is kept on. Other the electromagnetic valve B3 is turned off. Then, the electromagnetic valve B4 is turned on. The pressure switch B6 monitors and determines whether or not a sufficient vacuum is reached. When a sufficient vacuum is reached, the electromagnetic valve B4 is kept on. Other, the electromagnetic valve B4 is turned off.

Figure 5:
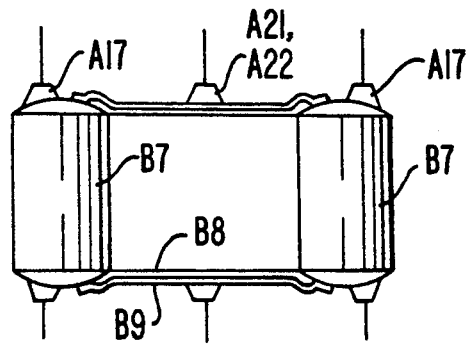
FIG. 5 is a schematic diagram of the structure of a band.
Figure 6:
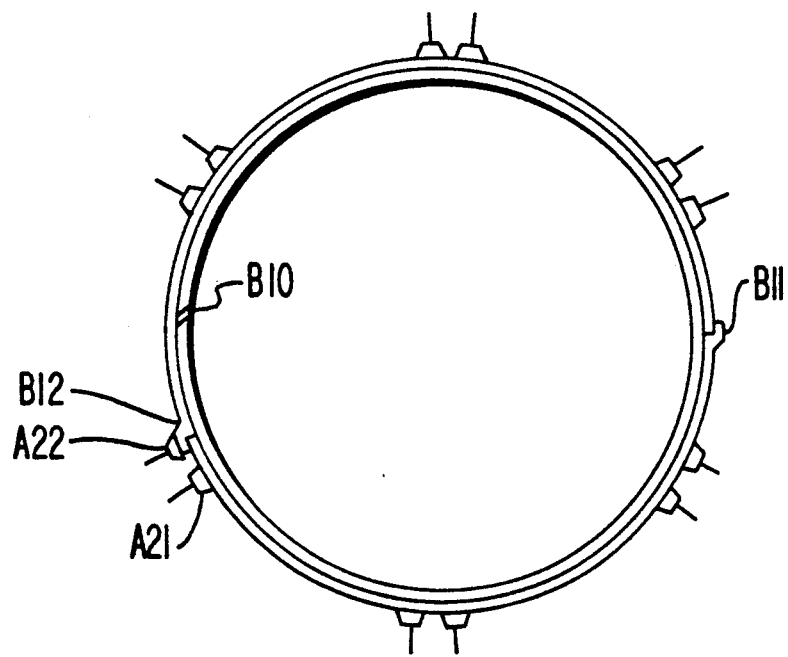
FIG. 6 is a diagram of joined portions of the band.
Figure 7:
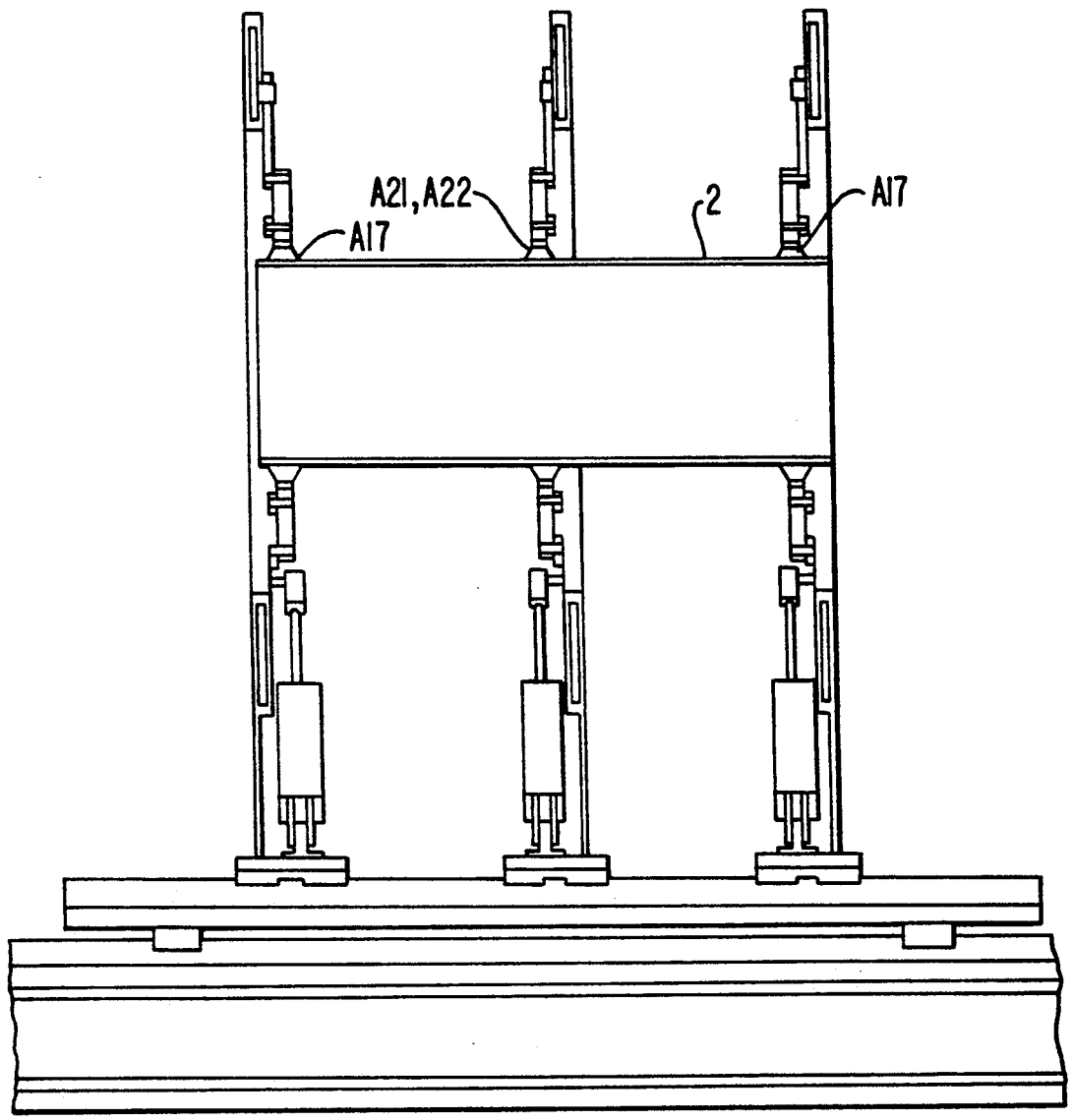
FIG. 7 is a side view showing the band conveying device with the band held thereby.

A band conveying device according to the present invention, as shown in FIG. 7, holds and conveys the cylindrical band 2 by means of the vacuum pads A17, A21 and A22. As shown in FIG. 5 in greater detail, the band 2 is composed of side walls B7, an inner liner B8, and a ply B9, these being arranged in laminated form. To hold the band, the vacuum pads A17 come into contact with the side walls, and the vacuum pads A21 and A22 come into contact with the ply. Since the side wall as well as the ply is formed by winding a belt-shaped rubber material into a cylindrical shape, they have joined portions arising in a forming step as shown in FIG. 6.

In FIG. 6, B10 designates a joined portion of the side wall, and B11 designates a joined portion of the ply. Usually, the joined portions arising in the forming step are circumferentially distributed such that they are out of phase or take a phase difference of 90° or 180° therebetween. That is, the joined portions of the side wall and the ply can be distributed so as not to be positionally aligned with the vacuum pads. If such provisions are not incorporated, air leaks through between the vacuum pad and the joined portion (having a rough surface) in an contact therewith, resulting in insufficient vacuum.

Since the side wall B7 is formed by extrusion, its belt-shaped material before a winding step has no joined portion. However, since the ply B9 is formed by connecting a plurality of strip-shaped material segments of given length, its belt-shaped material before the winding step has several joined portions. After the belt-shaped material is wound into a band shape, at least one joined portion (having arisen before the winding step) probably remains on the band. This primary joined portion differs from the joined portion arising in the forming step. Thus, it is generally impossible to put the vacuum pad out of alignment with the primary joined portion. Where the holding unit disposed at the center for holding the ply B9 has only one vacuum system of vacuum pads as in the prior art, if the joined portion is aligned with one vacuum pad, the central band-holding unit cannot attain its holding function. Further, if the capacity of a vacuum source is critical, the other vacuum pads cannot get a sufficient vacuum, making band conveying impossible.

According to the present invention, the vacuum pads of the central band-holding unit are circumferentially arranged in paired form and divided into two vacuum systems. Consequently, when the joined portion (arising before the winding step) is aligned with the vacuum pad by any chance, the one vacuum system inclusive of the above vacuum pad is put out of use and the other vacuum system is put in use, whereby the band can be held and conveyed reliably.

FIG. 6 shows the state wherein a primary joined portion B12 different from the joined portion arising in the forming step is in alignment with the vacuum pad A22. In this case, the electromagnetic valve B4 is turned off, so that the band is held by the vacuum pads A17 and A21.

In modification, an alarm may be provided which is actuated when both vacuum systems cannot get sufficient vacuum, or an additional pressure switch may be provided in a vacuum system including the vacuum pads A17 to monitor its degree of vacuum.

As described above, the band conveying device with vacuum attraction mechanism of the present invention comprises a base frame extending between a band forming station and a tire assembling station, a traveling carriage movable on the base frame, a plurality of band holding units provided on the traveling carriage perpendicularly with respect to the traveling direction thereof, and a plurality of vacuum pads for attracting and holding a band by vacuum which are arranged in annular form and attached to the band holding units. The vacuum pads are divided into at least two vacuum systems, and each of at least two vacuum systems is provided with a vacuum pressure switch and an electromagnetic valve for shutting off its vacuum system when its degree of vacuum decreases below a given level.

Therefore, the band can be attracted and conveyed by vacuum even in cases where the conventional vacuum system of vacuum pads cannot perform vacuum attraction because of the presence of the joined portion in the band material.

The joined portion arising in the forming step is properly oriented in the circumferential direction before band conveying, whereby both the joined portion of the band material and the joined portion arising in the forming step can be prevented from being positionally aligned with the vacuum pads.

The vacuum system whose degree of vacuum has decreased due to the roughness of the joined portion or the like is shut off by the electromagnetic valve responsive to the vacuum pressure switch for detecting the degree of vacuum.

When the degree of vacuum detected by the vacuum pressure switch is improper, an alarm is raised or the machine is stopped.

What is claimed is:

1. An annular band conveying device, comprising:
   a base frame;
   a travelling carriage movably mounted on said base frame;
   a plurality of annular band holding units provided on said traveling carriage so as to be capable of together holding an annular band, each said band holding unit having a plurality of vacuum pads thereon connected to a vacuum source and arranged annularly about said band holding unit for attaching and holding a band by vacuum;
   a first vacuum system connected to a plurality of said vacuum pads, said first vacuum system connecting said vacuum pads to the vacuum source through a first vacuum pressure switch and a first electromagnetic shut-off valve controlled by said first vacuum pressure switch for shutting off said first vacuum system when the degree of vacuum decreases below a predetermined level; and
   a second vacuum system connected to a plurality of different said vacuum pads, said second vacuum system connecting said plurality of different said vacuum pads to the vacuum source through a second vacuum pressure switch and a second electromagnetic shut-off valve controlled by said second vacuum pressure switch for shutting off said second vacuum system when the degree of vacuum decreases below a predetermined level;
   wherein said vacuum pads connected to said first vacuum system and said vacuum pads connected to said second vacuum system are provided on one said annular band holding unit; and
   wherein said vacuum pads of the one said band holding unit are distributed about the one said band holding unit in spaced pairs of said vacuum pads, one said pad of each said pair being connected to said first vacuum system, and the other said pad of each said pair being connected to said second vacuum system.

2. The band conveying device of claim 1, wherein:
   three said annular band holding units are provided and arranged on said travelling carriage in a row; and
   the central said annular band holding unit has said vacuum pads thereon which are connected to said first and said second vacuum systems.

3. The band conveying device of claim 2, wherein said vacuum pads of said annular band holding units on either side of the central said annular band holding unit, said first vacuum system and said second vacuum system are all connected to the vacuum source through a third electromagnetic valve.

* * * * *